United States Patent [19]

Tynes

[11] 4,179,186
[45] Dec. 18, 1979

[54] APPARATUS AND METHOD OF SPLICING OPTICAL FIBERS

[75] Inventor: Arthur R. Tynes, Red Bank, N.J.

[73] Assignee: Bell Telephone Laboratories, Incorporated, Murray Hill, N.J.

[21] Appl. No.: 892,275

[22] Filed: Mar. 31, 1978

[51] Int. Cl.² .......................... G02B 5/14; B65H 69/02
[52] U.S. Cl. .................................... 350/96.21; 156/158
[58] Field of Search .......................... 350/96.21, 96.22; 156/156, 157, 158

[56] References Cited

U.S. PATENT DOCUMENTS

| | | | |
|---|---|---|---|
| 3,768,146 | 10/1973 | Braun et al. | 350/96.21 |
| 3,810,802 | 5/1974 | Buhite et al. | 350/96.21 |
| 3,864,018 | 2/1975 | Miller | 350/96.21 |
| 3,865,662 | 2/1975 | Segal | 156/94 |
| 4,029,390 | 6/1977 | Chinnock et al. | 350/96.21 |
| 4,033,668 | 7/1977 | Presby | 350/96.21 |
| 4,057,448 | 11/1977 | Miller | 350/96.21 |

FOREIGN PATENT DOCUMENTS

| | | | |
|---|---|---|---|
| 2363987 | 7/1975 | Fed. Rep. of Germany | 350/96.21 |
| 1449787 | 9/1976 | United Kingdom | 350/96.21 |

OTHER PUBLICATIONS

Someda, "Simple, Low-Loss Joints Between Single Mode Optical Fibers", *Bell System Technical Journal*, vol. 52, No. 4, Apr. 1973, pp. 583-596.

*Primary Examiner*—Stewart J. Levy
*Attorney, Agent, or Firm*—John K. Mullarney

[57] ABSTRACT

Accurate simultaneous alignment and splicing of one or more pairs of optical fibers is achieved by the use of a glass coupler sleeve. One or more fiber holding channels are provided by the sleeve, each holding channel having at least one vertex and being configured to slidingly accept the optical fibers. The addition of a longitudinal slot to the coupler provides for the collapse of the coupler around the aligned fibers under predetermined heat and pressure, thereby providing permanent retention without the use of a bonding material.

8 Claims, 13 Drawing Figures

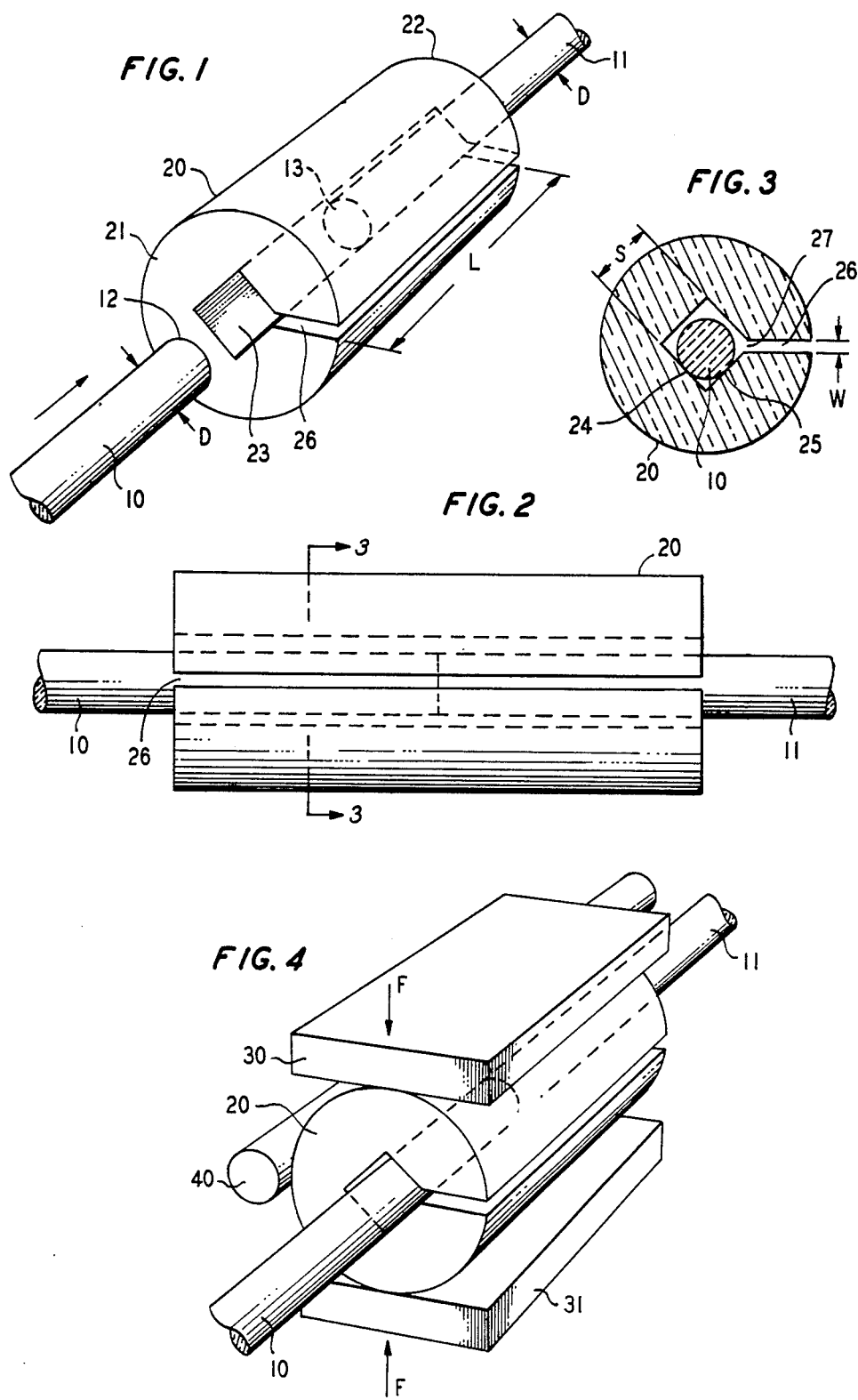

APPARATUS AND METHOD OF SPLICING OPTICAL FIBERS

TECHNICAL FIELD

The present invention relates to methods and apparatus for splicing optical fibers that is particularly well suited for field use.

BACKGROUND OF THE INVENTION

Numerous techniques and types of apparatus have been developed for the joining of optical fibers. It has long been known that fiber ends may be butt welded, by heating, or epoxying together. With the increased interest in optical fibers, more precise means of alignment and coupling were developed.

In an early technique disclosed by Braun et al, in U.S. Pat. No. 3,768,146 issued Oct. 30, 1973, the fibers are aligned by means of a V-groove disposed in a base plate. To provide a permanent connection, a metallic pliable sleeve is slipped over the fiber ends and crimped. This technique, while capable of providing a viable splice, requires a separate precision fixture for alignment and crimping. Moreover, the crimping operation can damage the fragile optical fibers. A high degree of care is therefore required.

The use of V-grooves in a coupler element is also known in the art. U.S. Pat. No. 4,033,668 to Presby, issued July 5, 1977, discloses the use of a two piece coupler element wherein each piece contains a V-groove for aligning the optical fibers. To form the splice, the peripheral surfaces of the fibers adjacent to the fiber ends are covered with a thin metallic coating. While the fibers are sandwiched between the V-groove in each coupler element, solder is deposited through apertures in said elements to secure the fiber ends together. This procedure, in addition to requiring alignment between the two pieces of the coupler element, requires extreme care in the metallic coating of the fiber periphery and deposition of solder to avoid the introduction of these materials on the fiber end cross section. Such a foreign material would obviously produce high coupling losses between the fibers. To avoid this possibility other techniques melt a thermoplastic material, with an index of refraction closely approximating that of the fiber to be spliced, to secure two optical fiber ends which are abutted.

Fibers have also been aligned by inserting them at an angle into a tube with a uniform noncircular cross section so that the fibers are biased into a corner of the interior cross section. The corner provides an aligning groove for the fiber ends. The technique is set forth in U.S. Pat. No. 4,057,448 which issued to C. M. Miller on Nov. 8, 1977. As with other techniques, Miller relies on epoxy to permanently retain the fiber ends.

In summary, all of the above techniques require a high degree of care to accomplish a satisfactory splice. Moreover, prior art materials, such as epoxies and plastics, have been found to age and eventually deteriorate. Therefore, these materials are not suited for use in communication systems where long term stability is required.

SUMMARY OF THE INVENTION

Pursuant to this invention, optical fibers are aligned through the use of a one piece coupler sleeve designed to simultaneously align and splice one or more pairs of optical fibers. Each optical fiber is disposed within a channel having a cross sectional aperture with at least one groove. The groove provides accurate means to guide the fibers to be spliced into end-to-end axial alignment. The coupler sleeve is also provided with a slot which intersects each channel and extends to the outer periphery of the coupler sleeve. This slot configuration allows the sleeve to collapse upon the application of heat and pressure so as to securely retain the fibers in precise axial alignment. The collapsing feature also allows the same coupler to be used for a range of optical fiber diameters. Hence there is no need to inventory different couplers for each fiber size.

As the coupler is fabricated from glass which has a greater thermal coefficient of expansion and contraction than the fibers, additional fiber retaining forces are generated when the coupler cools after collapse. The later expansion of the coupler caused by the thermal operating conditions of the fibers is substantially less than the contraction during cooling. Therefore, the advantage of these additional retaining forces is long term.

It is an advantage of the present invention that it provides methods of splicing optical fibers under adverse environmental conditions, and is performable by personnel without specific expertise in optical fibers.

It is another advantage of the present invention that the apparatus and techniques employed eliminate the need for epoxies or any index matching fluids. As such, couplers in accordance with the present invention possess long term stability under varying temperature and humidity conditions.

Another advantage of the present invention resides in the fact that the requirement of specialized fixtures and tooling are eliminated for both field application and manufacture of the coupler element.

BRIEF DESCRIPTION OF THE DRAWING

FIG. 1 shows an embodiment of an optical fiber coupler and arrangement of fiber in accordance with the present invention;

FIG. 2 shows a side view of the coupler of FIG. 1 with the optical fibers fully inserted;

FIG. 3 shows a section 3—3 of FIG. 2 and illustrates the position of the fibers within the sleeve;

FIG. 4 shows the method of forming an optical fiber splice;

DETAILED DESCRIPTION

Figure 5:
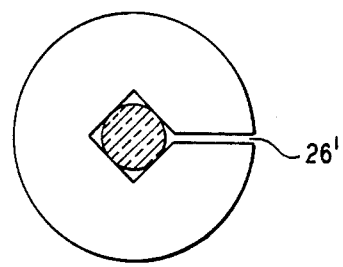
FIG. 5 shows section 3—3 after the splice is performed.

One embodiment of the invention, comprising a slotted sleeve coupler 20 with a substantially square hole 23 extending therethrough, is illustrated in FIG. 1. Economical and precision sleeves of the type shown have been fabricated from glass by a drawing technique. In particular, such sleeves have been designed with a hole 23 proportioned to slidingly accept optical fibers of 3 to 6 mils (0.00762 to 0.01524 cm) in diameter. The sleeve wall thickness is typically 2 to 4 mils (0.00508 to 0.01016 cm.).

Referring to FIGS. 1, 2 and 3, fibers 10 and 11 to be joined are inserted into opposite ends 21 and 22 of sleeve 20 until the fiber end faces 12 and 13 abut. To achieve precision alignment of fiber end faces 12 and 13, hole 23 is advantageously provided with substantially square interior cross section whose side dimension S is slightly larger than the diameter D of each of the fibers 10 and 11. As a result, when fibers 10 and 11 are inserted into sleeve 20, shown horizontally disposed, the periphery of each of the fibers 10 and 11 can be conveniently made to tangentially contact any of two intersecting walls such as 24 and 25 whereby they are axially aligned with each other. While sleeve 20 is shown in FIGS. 1, 2 and 3 to be horizontally disposed, such an orientation is not necessary to practice the present invention inasmuch as the collapsing feature of the sleeve, described infra, will bias the optical fibers against any two intersecting walls. Alignment and splicing can therefore be accomplished irrespective of sleeve orientation.

As noted hereinabove, sleeve 20 also contains a lengthwise slot 26. This slot extends radially from an apex 27 of hole 23 to the sleeve's outer periphery. The slot also extends over the entire length L of sleeve 20. The width W of the slot is preferably designed to be less than the diameter of the fibers to be joined. Typically, the slot is designed to be one-half the optical fiber diameter D. This limitation on the width W prevents lateral displacement of the fibers 10 and 11 once they are aligned and abutted end-to-end.

To form a permanent connection between the fibers 10 and 11, the assembly of sleeve and abutting fibers is placed between two blocks 30 and 31 as shown in FIG. 4. While a compressive force F is exerted on the blocks 30 and 31, heat is applied to the sleeve along the area opposite the slot. In FIG. 4, radiant heating through the use of a nicrome wire 40 is illustrated. The combination of heat and pressure causes the sleeve to collapse around the fiber so that the circumference of the fibers tangentially contacts each side wall of the hole. FIG. 5 depicts a completed splice.

It should be noted that the sleeve is oriented within the blocks so that when compressive forces are exerted on the blocks these forces will have components which are perpendicular to the slot and thereby act to close the same. Moreover, it is advantageous, though not necessary, that the blocks be thermally conductive so as to localize the heat transferred to the sleeve. While softening the sleeve wall opposite the slot is required, the heat transferred should not soften and distort the hole 23. Such distortion could cause misalignment of the fibers and result in excessive splice loss.

It will be recognized that, in practice, the clamping arrangement along with the shape and composition of the block material can be varied without departing from the scope of this invention. Furthermore, the means used to transfer heat to the sleeve may be a small torch held near the sleeve or a heat dissipating element such as a resistor, affixed to the sleeve. In short, a myriad of heating techniques may also be utilized.

Figure 6:
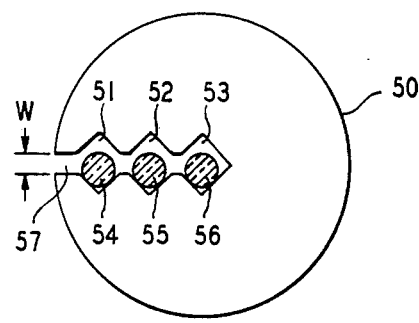
FIGS. 6 and 7 illustrate a cross sectional view equivalent to FIGS. 3 and 5, respectively, of a multiple fiber version of the coupler shown in FIG. 1.
Figure 7:
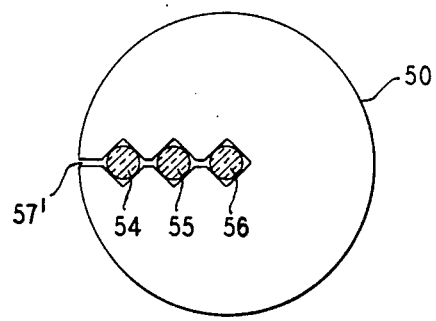

The above apparatus and method set forth for a single pair of optical fibers can, of course, be extended to multiple pairs of optical fibers. FIGS. 6 and 7 depict a view equivalent to FIG. 3 of such an apparatus prior to and after splicing, respectively. As illustrated, the sleeve coupler 50 has three substantially square holes 51, 52, and 53, each designed to slidingly align three optical fibers 54, 55 and 56. Similar to the single fiber sleeve 20, the slot 57 intersects each hole so as to enable the collapsing of the sleeve around each fiber pair after splicing. The method of performing the splice is identical to that discussed supra. It should be noted that as shown in both FIGS. 5 and 7, a slight gap 26' and 57' may exist in the sleeve circumference after splicing. This gap is a function of the initial sleeve width W. If desired, this gap can be eliminated by the use of a very narrow initial width or by the use of epoxy to seal the gap. It should be noted that the use of epoxy here is to provide a dust cover and is not part of the optical transmission path. Therefore, deterioration of the epoxy with time will not adversely affect coupling efficiency.

Figure 8:
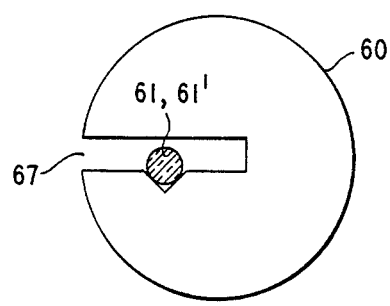
FIGS. 8 and 9 depict a cross sectional view prior to and after splicing, respectively, of another coupler configuration in accordance with the present invention.
Figure 9:
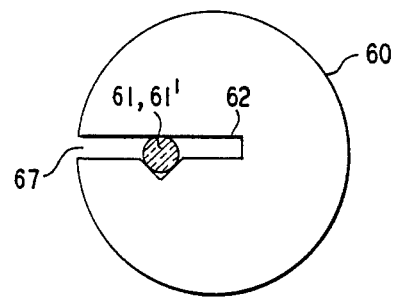
Figure 10:
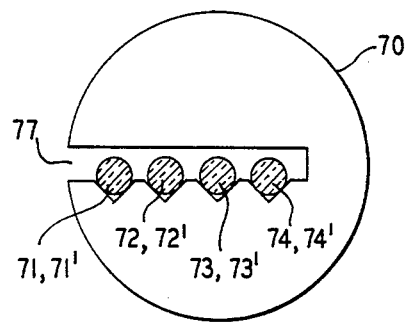
FIGS. 10 and 11 show a cross sectional view prior to and after splicing respectively of a multiple fiber version of the coupler of FIGS. 8 and 9.
Figure 11:
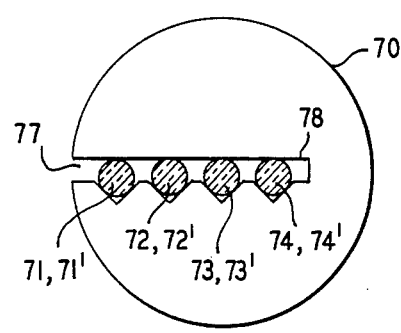

It will also be readily apparent to one skilled in the art that the interior cross sectional shape of the sleeve can be varied without departing from the scope of the invention. FIGS. 8, 9, 10 and 11 illustrate respectively alternate cross sectional configurations for single pair and multiple pair fiber coupling sleeves. FIGS. 8 and 9 illustrate the sleeve 60 containing aligned fibers 61—61', of which a representative cross section is shown, prior to and after splicing, respectively. In similar fashion, FIGS. 10 and 11 show a multiple pair fiber sleeve coupler 70 containing multiple pairs of fibers 71—71', 72—72', 73—73', 74—74' prior to and after splicing, respectively. Sleeves 60 and 70 are identical to the sleeves described previously except for the employment of substantially triangular shaped holes disposed adjacent to slot 67 and 77, in lieu of the substantially square holes described supra. The use of the triangular hole does provide a manufacturing advantage. As there are fewer sharp corners, the use of a triangular hole is easier to fabricate by drawing. The method of aligning and splicing fiber with these cross sections is, of course, identical to that described above. As shown, when the sleeve 60 and 70 collapse the intersecting surfaces and slot surfaces 62 and 78 tangentially contact the fibers.

It should be recognized that all of the above embodiments can align and splice optical fibers within a range of optical fiber diameters. The fiber must of course be slidingly acceptable into the sleeve and must be large enough so that the fully collapsed sleeve will exert compressive forces on the fibers. For this latter condition to occur, a part of the fiber cross section must protrude into the area of the slot.

Fabrication of the sleeve may be accomplished using state of the art techniques. For example, to initially form a substantially square hole, a hollow tube is heated and then allowed to collapse onto a square mandrel. After the mandrel is removed, a slot is then cut along the tube length. While heat is applied to one end of the tube, the tube is drawn until the required sleeve dimensions are realized. Finally, the drawn material is separated into the desired length. Using the above procedure, satisfactory sleeves have been produced using PYREX or soda-lime glass capillary tubes with an inner diameter of about 100 times the final diameter. By using a large draw, many thousands of coupler sleeves, each about 0.39 inches (1 cm) long, can be realized in one production step. Moreover, as the material is drawn down, there is a proportional decrease in tolerances. The final sleeve, therefore, has an inner hole with extremely accurate dimensional tolerances. Splice losses of 0.05 dB are attainable using the techniques described above. Other desired interior cross sectional shapes can be produced by using mandrels of the desired shape. It is advantageous to use glass having a melting point less than that of the optical fibers. Typically a melting point of from 500 to 1200 degrees C. is suitable.

Figure 12:
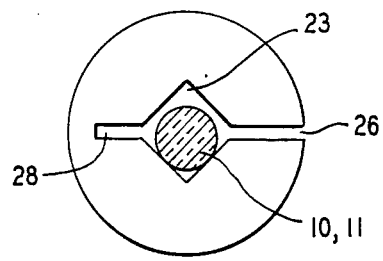
FIGS. 12 and 13 are cross sectional views of alternate embodiments of the optical fiber coupler of FIG. 1.
Figure 13:
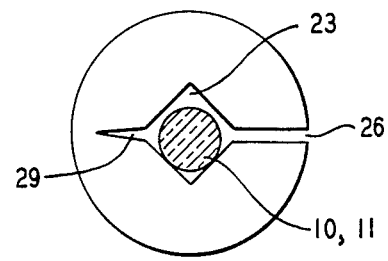

FIGS. 12 and 13 depict a cross sectional view of still further embodiments of a coupler sleeve prior to splicing. In FIG. 11, an additional rectangular cross sectional hole 28 is added. As illustrated, aperture 28 intersects hole 23 and is disposed opposite to slot 26. In FIG. 13, a triangular cross sectional hole 29 is added. Aperture 29 also intersects aperture 23 and is located opposite slot 26. Both apertures 28 and 29 do not extend completely through the sleeve wall. The sole function of apertures 28 and 29 is to facilitate the collapsing of sleeve 20 around the fibers 10 and 11. The fabrication of these additional holes requires no additional steps and is simply accomplished by the use of an appropriately shaped mandrel, or by an appropriate addition to the mandrel used. The method of splicing remains the same. Moreover, in similar fashion these additional holes can be added to any of the above described coupler configurations.

I claim:

1. A coupler for splicing one or more pairs of optical fibers (10, 11) end to end, comprising a sleeve (20) having at least one fiber holding channel (23) extending longitudinally therethrough, each holding channel having at least one V-shaped groove of sufficient size so that the circumference of the optical fibers is capable of tangentially contacting each side (24, 25) of the groove CHARACTERIZED IN THAT said sleeve further includes a first slot (26) beginning at the outer periphery of said sleeve and extending into each holding channel, said slot having a small width (W) that is less than the diameter (D) of the fibers to be spliced, said sleeve being collapsed about said fibers as a result of the application of a predetermined elevated temperature in combination with a predetermined elevated pressure, said temperature serving to soften the sleeve material to permit the controlled collapse of said sleeve under said elevated pressure, said collapsed sleeve retaining said fibers in precise alignment by insuring that all fibers tangentially contact each side of said groove.

2. The coupler of claim 1 CHARACTERIZED IN THAT said sleeve (20) also includes a second slot extending longitudinally therethrough, said second slot being disposed substantially opposite said first slot and beginning from said holding channel and extending partially through the wall of said sleeve.

3. The coupler of claim 2 CHARACTERIZED IN THAT said second slot is of rectangular cross section.

4. The coupler of claim 2 CHARACTERIZED IN THAT said second slot is of triangular cross section.

5. The coupler of claim 1 CHARACTERIZED IN THAT said sleeve is fabricated from glass having a melting point between 500 and 1200 degrees Centigrade.

6. A method of splicing one or more pairs of optical fibers comprising the steps of inserting said fibers (10, 11) into an alignment sleeve (20) until the fiber ends (12 and 13) abut, said sleeve having at least one fiber holding channel (23) extending longitudinally therethrough, each holding channel having at least one V-shaped groove of sufficient size so that the circumference of the optical fibers is capable of tangentially contacting each side of the groove, CHARACTERIZED IN THAT said sleeve also has a slot (26) beginning at the outer periphery of said sleeve and extending into each holding channel, and by the further steps of clamping the assembly of the sleeve containing abutting optical fibers so that a slight force (F) is exerted perpendicular to said slot, and heating said assembly while clamped along the sleeve wall region opposite said slot to collapse said sleeve around said fibers without gross distortion of said V-shaped groove.

7. The method of claim 6 CHARACTERIZED IN THAT the width (W) of said slot (26) is smaller than the diameter (D) of the fibers to be spliced.

8. The method of claim 6 CHARACTERIZED IN THAT the clamping is accomplished through the use of thermally conductive blocks.

* * * * *